United States Patent [19]

Haas et al.

[11] Patent Number: 5,459,171

[45] Date of Patent: Oct. 17, 1995

[54] CORE DISCOLORATION PREVENTING AGENTS IN THE PRODUCTION OF ISOCYANATE-BASED FOAMS

[75] Inventors: Peter Haas, Haan; Sven Meyer-Ahrens, Leverkusen; Gundolf Jacobs, Rösrath, all of Germany

[73] Assignee: Bayer Aktiengesellschaft, Leverkusen, Germany

[21] Appl. No.: 356,611

[22] Filed: Dec. 15, 1994

[30] Foreign Application Priority Data

Dec. 23, 1993 [DE] Germany .................. 43 44 180.7

[51] Int. Cl.⁶ ...................................... C08J 9/00
[52] U.S. Cl. ........................................ 521/130; 521/902
[58] Field of Search ............................ 521/130

[56] References Cited

U.S. PATENT DOCUMENTS

| | | | |
|---|---|---|---|
| 3,649,667 | 3/1972 | Song et al. | 260/473 S |
| 3,839,277 | 10/1974 | Spivack et al. | 260/45.75 N |
| 3,969,530 | 7/1976 | Mauz et al. | 424/308 |
| 4,594,444 | 6/1986 | Orban | 560/67 |
| 4,716,244 | 12/1987 | Orban | 560/75 |

FOREIGN PATENT DOCUMENTS

| | | |
|---|---|---|
| 333468 | 9/1989 | European Pat. Off. . |
| 574651 | 12/1993 | European Pat. Off. . |

OTHER PUBLICATIONS

Database WPI An 4345R, 'Preventing Discoloration of Polyolefins' & JP-A-45 000 280 (Mitsubishi Rayon).

K. C. Smeltz, Textile Chemist and Colorist, Apr. 1983, vol. 15, No. 4.

E. Schmidt, Textilveredlung 17/1982, No. 6 (Month Unavailable).

H.-W. Hemmpel, Textil Praxis International 1983, Mar./Apr. issue.

*Primary Examiner*—Morton Foelak
*Attorney, Agent, or Firm*—Joseph C. Gil; Lyndanne M. Whalen

[57] ABSTRACT

Compounds of the general formula

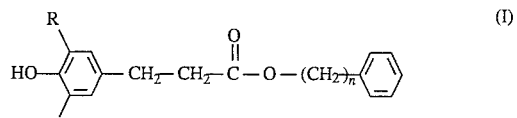

and/or

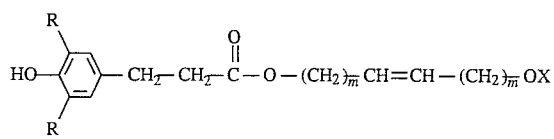

in which n represents an integer from 2 to 6, preferably 2 or 3,
m represents an integer from 1 to 6, preferably 1 to 3,
R represents —$C(CH_3)_3$ and
X represents hydrogen or the group

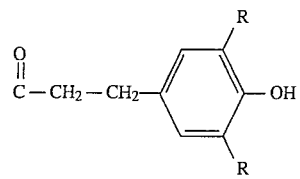

are used as core discoloration preventing agents in a process for the production of isocyanate-based foams.

14 Claims, No Drawings

CORE DISCOLORATION PREVENTING AGENTS IN THE PRODUCTION OF ISOCYANATE-BASED FOAMS

BACKGROUND OF THE INVENTION

The present invention relates to a process for the production of isocyanate-based foams in which at least one agent corresponding to a specified formula is used to prevent discoloration of those foams.

Low-density polyurethane foams tend to discolor at their core as a result of the highly exothermic nature of the vigorous blowing reaction which takes place when large quantities of water are used.

A number of stabilizers to counter this discoloration reaction which is due to temperature are disclosed in the literature. One example of these known stabilizers is 4-methyl-2,6-di-tert.-butylphenol (BHT). This stabilizer is generally included in the polyol component used to produce the foam.

However, stabilization with materials such as BHT also causes a number of disadvantages such as discoloration of textiles and the foam due to reactions which are now better understood. (See, for example, K. C. Smelts, Textile Chemist and Colorist, April 83, Vol. 15, No. 4, E. Schmidt, Textilveredlung 17/1982; and No. 6, H.-W. Hemmpel, Textil Praxis International 1983, March/April issue).

The esters of 4-hydroxy-3,5-di-tert.-butylphenyl propionic acid are also described in the literature as core discoloration preventing agents. However, stabilization of isocyanate-based foams, above all of polyurethane foams, with a view to: (1) effective prevention of core discoloration, (2) avoidance of foam discoloration due to subsequent formation of chromophores, and (3) avoidance of textile discoloration due to migration of chromophore carriers has so far proven elusive.

SUMMARY OF THE INVENTION

It is an object of the present invention to find core discoloration preventing agents which do not have the disadvantages of known discoloration prevention compounds.

It is another object of the present invention to provide a process for the production of isocyanate-based foams which do not exhibit the core discoloration of prior art foams.

It is a further object of the present invention to provide isocyanate-based foams which do not exhibit the core discoloration of prior art foams.

These and other objects which will be apparent to those skilled in the art are accomplished by incorporating at least one discoloration preventing agent represented by one of two specified formulae in the foam forming-mixture.

DETAILED DESCRIPTION OF THE PRESENT INVENTION

The present invention relates to a process for the production of isocyanate-based foams in which an isocyanate is reacted with an isocyanate-reactive compound in the presence of at least one compound represented by the general formula

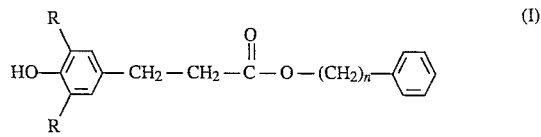

and/or

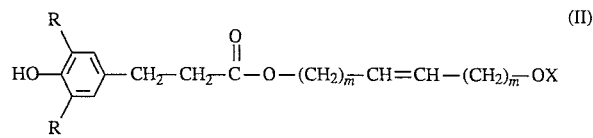

in which n represents an integer from 2 to 6, preferably 2 or 3, m represents an integer from 1 to 6, preferably 1 to 3

R represents —C(CH$_3$)$_3$ and

X represents hydrogen or

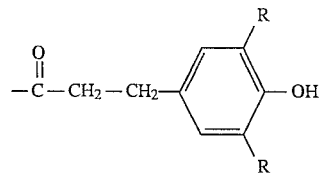

The compounds represented by Formula (I) and Formula (II) act as core discoloration preventing agents.

It is preferred that the compounds represented by Formula (I) and/or (II) be used in a quantity (total amount) of from 0.01 to 0.5% by weight, based on the isocyanate-based foam. It is particularly preferred that the compounds Formula (I) and/or Formula (II) be used in a quantity (total amount) of from 0.1 to 0.4 wt %, calculated on the isocyanate-based foam.

The preferred discoloration prevention agent is represented by Formula (I)

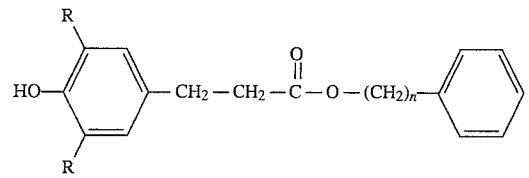

in which R represents the group —C(CH$_3$)$_3$ and n represents 2 or 3.

The preferred discoloration prevention agent represented by Formula (II) is

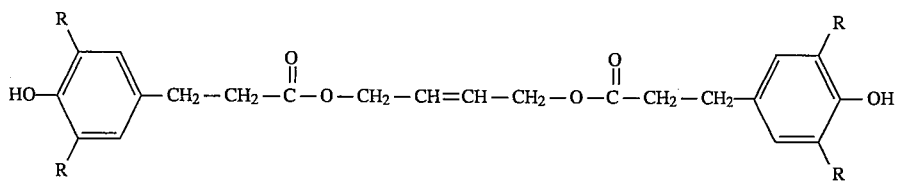

in which R represents the group —C(CH$_3$)$_3$.

In another preferred embodiment of the invention, known core discoloration preventing agents which do not correspond to either Formula (I) or Formula (II), particularly diaryl amines, are also included in the foam-forming mixture.

The compounds corresponding to Formula (I) and/or Formula (II) are particularly useful in the production of polyurethane foams and in the production of polyisocyanurate foams.

DE-PS 2,240,609 and IA-PS 16,631 describe some alkyl esters and aryl esters of 4-hydroxy-3,5-di-tert.-butylphenyl propionic acid as being useful for stabilizing plastics and oils. These disclosures do not, however, teach or suggest that these compounds, especially the aryl esters, would inhibit the discoloration of foams. In fact, the compound

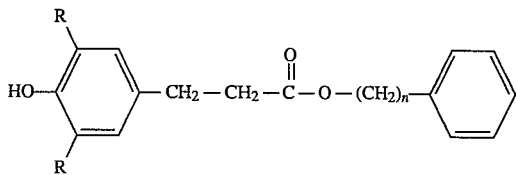

in which

R represents —C(CH$_3$)$_3$ and n represents 1 produces a foam which exhibits a marked discoloration in the EMPA textile test (EMPA, St. Gallen, Textile Chemistry Dept., project No. 1145, 1984) and has a moderate core discoloration prevention effect. In contrast, compounds corresponding to Formula (I) in which n represents an integer from 2 to 6, preferably 2 or 3, used in accordance with the present invention effectively prevent discoloration.

Similarly, the alkyl esters exhibit no predictable foam discoloration prevention effect. Compounds corresponding to Formula (II) are clearly superior to the corresponding 1,4-tetramethylene ester in terms of antioxidant effect and in discoloration effect in the textile test. The compounds corresponding to Formula (II) showed virtually no tendency towards discoloration in the textile test.

Processes for the production of isocyanate-based foams are known. Examples of these processes are disclosed, for example, in DE-OS 1,694,142; 1,694,215 and 1,720,768, and in the Kunststoff-Handbuch [Plastics Manual], Vol. VII, Polyurethanes, edited by Vieweg and Höchtlen, Carl Hanser Verlag, Munich, 1966, and in the new edition of the latter book, edited by G. Oertel, Carl Hanser Verlag Munich, Vienna 1983 and 1993.

The foams described in these disclosures are predominantly foams having urethane and/or isocyanurate and/or allophanate and/or uretdione and/or urea and/or carbodiimide groups. The present invention is preferably directed to the production of polyurethane foams and polyisocyanurate foams.

Isocyanate-based foams are generally produced by reacting an isocyanate, compounds having isocyanate-reactive groups, a blowing agent, and optional additives such as catalysts and surface active additives.

Isocyanates which are useful as starting materials in the process of the present invention include: aliphatic, cycloaliphatic, araliphatic, aromatic and heterocyclic polyisocyanates such as those described by W. Siefken in Justus Liebigs Annalen der Chemie, 562, pages 75 to 136. Examples of such isocyanates are compounds corresponding to the formula Q(NCO)$_n$ in which n represents 2 to 4, preferably 2 to 3, and Q represents an aliphatic hydrocarbon radical having 2 to 18 (preferably 6 to 10) carbon atoms, a cycloaliphatic hydrocarbon radical having 4 to 15 (preferably 5 to 10) carbon atoms, an aromatic hydrocarbon radical having 6 to 15 (preferably 6 to 13) carbon atoms or an araliphatic hydrocarbon radical having 8 to 15 (preferably 8 to 13) carbon atoms.

Specific examples of such polyisocyanates are given in DE-OS 28 32 253, pages 10 to 11. Generally, the commercially available polyisocyanates are preferred. Examples of suitable isocyanates which are commercially available include: 2,4- and 2,6-tolylene diisocyanate, and any mixtures of these isomers ("TDI"); polyphenyl polymethylene polyisocyanates such as those prepared by aniline-formaldehyde condensation followed by phosgenation ("raw MDI"); and polyisocyanates having carbodiimide groups, urethane groups, allophanate groups, isocyanurate groups, urea groups or biuret groups ("modified polyisocyanates"), in particular such modified polyisocyanates as are derived from 2,4- and/or 2,6-tolylene diisocyanate or from 4,4'- and/or 2,4'-diphenyl-methane diisocyanate.

Isocyanate-reactive compounds useful as starting materials in the process of the present invention include compounds having at least two hydrogen atoms which are reactive with isocyanates having a molecular weight which is generally from 400 to 10,000 ("polyol component"). These compounds include materials having amino groups, thio groups or carboxyl groups as well as the preferred hydroxyl group containing compounds. Compounds having at least 2, preferably from 2 to 8, most preferably from 2 to 6 hydroxyl groups, particularly those having a molecular weight of from about 1000 to about 6000 (preferably from about 2000 to about 6000) such as polyethers and polyesters, and polycarbonates and polyester amides, which are known to be useful for producing homogeneous and cellular polyurethanes are particularly preferred. Specific examples of such isocyanate-reactive compounds are given in DE-OS 28 32 253, pages 11 to 18. The polyethers and polyesters having at least two hydroxyl groups are most preferred.

Other compounds useful as optional starting materials for the production of isocyanate-based foams in accordance with the present invention include compounds having at least two hydrogen atoms which are reactive with isocyanates, and having a molecular weight of from 32 to 399 which function as chain extenders or crosslinking agents. These compounds may have hydroxyl groups and/or amino groups and/or thio groups and/or carboxyl groups. Preferred compounds are those having hydroxyl groups and/or amino groups. These compounds generally have from 2 to 8 (preferably from 2 to 4) hydrogen atoms which are reactive with isocyanates. Specific examples of such compounds are given in DE-OS 28 32 253, pages 19 to 20.

Any of the known blowing agents may be used in the process of the present invention. However, it is preferred that a blowing agent such as water and/or a highly volatile organic substance such as n-pentane, isopentane, cyclopentane be used.

Known auxiliary substances and additives may also be included in the foam-forming mixture. Such optional additives include: catalysts; surface-active additives such as emulsifying agents and foam stabilizers; reaction retardants such as materials which act as acids (e.g., hydrochloric acid or organic acid halides); cell regulators such as paraffins or fatty alcohols or dimethyl polysiloxanes; pigments; dyes; flame retardants such as tricresyl phosphate and melamine; stabilizers to counter the effects of ageing and weathering; plasticizers; fungistats and bacteriostats; and fillers such as barium sulfate, diatomaceous earth, carbon black or whiting.

These auxiliary substances and additives which may optionally be used are described in greater detail in DE-OS 27 32 292, pages 21 to 24.

Additional examples of surface-active additives, foam stabilizers, cell regulators, reaction retardants, stabilizers, flame retardants, plasticizers, dyes, fillers, fungistats and bacteriostats, which may optionally be used in the practice of the present invention, are described in the Kunststoff-Handbuch [Plastics Manual], Vol. VII, edited by Vieweg and Höchtlen, Carl Hanser Verlag, Munich, 1966, for example on pages 103 to 113, as well as details with respect to the use and activity of these additives.

Isocyanate-based foams such as polyurethane foams may be produced in accordance with the present invention by reacting the starting components by any of the known one-shot processes, prepolymer processes or semi-prepolymer processes. These processes may be carried out using mechanical devices such as those described in U.S. Pat. No. 2,764,565. Details of other processing devices which may also be used to carry out the process of the present invention are given in the Kunststoff-Handbuch [Plastics Manual], Vol VII, edited by Vieweg and Höchtlen, Carl Hanser Verlag, Munich, 1966, for example on pages 121 to 205.

The compounds represented by Formula (I) and/or Formula (II) may be added to the polyol component or to the isocyanate component.

Cold-curing foams may also be produced in accordance with the present invention. GB-PS 11 62 517 and DE-OS 21 53 086 disclose suitable techniques for the production of such foams.

Foams may also be produced by slab foaming or by any of the known continuous lamination processes in accordance with the present invention.

Polyisocyanurate foams may be produced by any of the known processes under the conditions generally used for such processes.

The products of the process of the present invention may be used as furniture upholstery, textile linings, mattresses, motor car seats, armrests, sponges, construction elements, trims for seats and mountings.

Having thus described our invention, the following Examples are given as being illustrative thereof. All parts and percentages given in these Examples are parts by weight and percentages by weight, unless otherwise indicated.

EXAMPLES

Example 1

3-(4-hydroxy-3,5-di-tert.-butylphenyl)-propionic acid-2-phenylethyl ester was prepared from 278 g (1 mol) of 3-(4-hydroxy-3,5-di-tert.-butylphenyl)-propionic acid and 122 g (1 mol) of 2-phenylethanol by azeotropic esterification in toluene with 0.5 g of 4-toluenesulfonic acid. The product was analyzed and the results of this analysis were as follows:

Analysis for $C_{25}H_{34}O_3$ (382) Calc. C: 78.5% H: 8.9% Actual C: 78.6% H: 9.1%

Melting point: 72° to 74° C.

The structure was further confirmed by IR and NMR spectra.

Example 2

2-butene-1,4-diol-bis-[3-(4-hydroxy-3,5-di-tert.-butylphenyl)-propionate] was prepared from 556 g (2 mol) of 3-(4-hydroxy-3,5-di-tert.-butylphenyl)-propionic acid and 88 g (1 mol) of 2-butene-1,4-diol by azeotropic esterification in toluene with 0.5 g of 4-toluenesulfonic acid. The product was analyzed and the results of this analysis were as follows:

Analysis for $C_{38}H_{56}O_6$ (608) Calc. C: 75.0% H: 9.2% Actual C: 74.4% H: 9.0%

Melting point: 73° to 75° C.

The structure was further confirmed by IR and NMR spectra.

Example 3 (Comparative)

3-(4-hydroxy-3,5-di-tert.-butylphenyl)-propionic acid benzyl ester was prepared from 278 g (1 mol) of 3-(4-hydroxy-3,5-di-tert.-butylphenyl)-propionic acid and 108 g (1 mol) benzyl alcohol by azeotropic esterification in toluene with 0.5 g of 4-toluenesulfonic acid. The product was analyzed and the results of this analysis were as follows:

Analysis for $C_{24}H_{32}O_3$ (368) Calc. C: 78.2% H: 8.7% Actual C: 78.1% H: 8.3%

Melting point: 68° to 70° C.

The structure was further confirmed by IR and NMR spectra.

Example 4 (Comparative)

Bis-[3-(4-hydroxy-3,5-di-tert.-butylphenyl)-propionic acid butanediol ester] was prepared from 278 g (1 mol) of 3-(4-hydroxy-3,5-di-tert.-butylphenyl)-propionic acid and 45 g (0.5 mol) of 1,4-butanediol by azeotropic esterification in toluene with 0.5 g of 4-toluenesulfonic acid. The product was analyzed and the results of this analysis were as follows:

Analysis for $C_{38}H_{58}O_6$ (610) Calc. C: 74.7% H: 9.5% Actual C: 74.1% H: 9.2%

Melting point: 73° to 74° C.

The structure was further confirmed by IR and NMR spectra.

In order to test the antioxidant potential of the compounds produced in Examples 1 and 2 (according to the invention), Examples 3 and 4 (comparative), and BHT (Comparative), these compounds were used alone as the antioxidant in a polyurethane flexible foam formulation. The foams produced were then subjected to a microwave treatment.

Foam packets were first prepared from the following formulation:

| | |
|---|---|
| Polyol component A | 100 parts by weight |
| Core discoloration-preventing stabilizer indicated in Table 1 | 0.2 parts by weight |
| Water | 6.0 parts by weight |
| Silicone stabilizer OS 22 (available from Bayer AG) | 1.5 parts by weight |
| Amine activator PS 207 (available from Bayer AG) | 0.15 parts by weight |
| Tin octoate | 0.15 parts by weight |
| TDI made up of 80 wt-% 2,4- and 20 wt-% 2,6-tolylene diisocyanate, (isocyanate index = 108) | 70.2 parts by weight |

Polyol component A was a trimethylolpropane-initiated polyether polyol of 85 wt % propylene oxide and 15 wt % ethylene oxide having predominantly secondary OH groups and an OH number of 45.

Foams having interconnecting cells and a maximum air permeability of 50 mm water column were obtained when the above-listed materials were reacted.

A double batch of foam-forming mixture was poured into a 100×200 mm mold. When foam rise was terminated, the packet was placed in the middle of a Panasonic NE 1440 microwave oven and heated at level 1 (approx. 170 Watt microwave action) for 15 minutes. Heating was then completed in a circulated air drying oven at 130° to 135° C. for 30 minutes, and the packet was sliced through the middle along the longitudinal axis after 30 minutes storage at room temperature. A 3 cm-thick disc was removed and evaluated in order to classify core discoloration.

Level 0: completely white

Level 10: blackish-brown with signs of decomposition.

Textile yellowing test: Approx. 20 g of an untreated white cotton textile 200×200 mm in size were impregnated with 60 ml of a solution of 1000 ml water and 40 ml of a conventional commercial cationic fabric softener solution and wrapped round an 80×80×50 mm foam cube. The wrapped foam was then dried in a circulated air drying oven at 55° C. for 72 hours.

Any color changes in the foam and textile were then determined, in accordance with the EMPA textile test.

Table 1 sets out the results of the microwave core discoloration test and the textile test. These tests are useful in determining migration and discoloration behavior.

| Sample | Core discoloration stabilizer | Degree of discoloration | Discoloration Textile | Discoloration Foam |
|---|---|---|---|---|
| A | Ex. 1 | 2–3 | white | white |
| B | Ex. 2 | 2 | white | white |
| C | Ex. 3 | 5 | yellow | very yellow |
| D | Ex. 4 | 5 | yellow | yellow |
| E | BHT | 3 | very yellow | very yellow |

Table 1 shows that of the materials tested, only the antioxidants required in the present invention meet the requirements of (1) a core discoloration effect comparable to that obtained with the proven BHT and (2) no color change to either foam or textile in, e.g., the EMPA test.

The comparative materials produced in Examples 3 and 4 are known compounds which are similar in structure to compounds represented by Formula (I) (Example 1) and Formula (II) (Example 2) required in the present invention. As is evident from the results reported in Table 1, these comparative materials do not satisfy the core discoloration and foam/textile color change requirements of the present invention.

The good performance of antioxidants corresponding to Formula (I) and Formula (II) in accordance with the present invention is surprising and could not be implied from the prior art as is evident from the fact that compounds with very similar structures give different results. The discoloration prevention agents required in the present invention can be used above all in affording protection from discoloration to polyether and polyester polyols used to produce polyurethane foam slabstock and molded foams. When made up in textiles, upholstered furniture, mattresses and motor car seats, foams produced in accordance with the present invention show no migration effects. The isocyanates used to produce polyurethane foams may also be protected from discoloration by the discoloration prevention agents corresponding to Formula (I) and/or Formula (II).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of isocyanate-based foams comprising reacting a) an isocyanate with b) an isocyanate-reactive compound in the presence of c) at least one compound which prevents discoloration of the foam represented by one of the following formulae

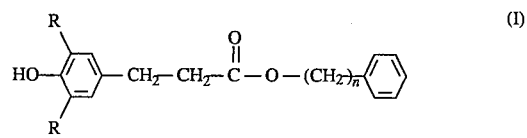

or

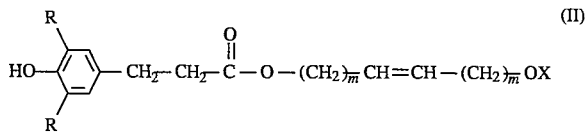

in which

R represents the group —C(CH$_3$)$_3$,

X represents hydrogen or the group

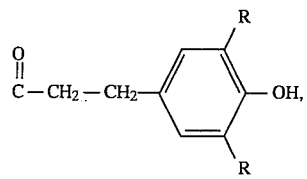

n represents an integer of from 2 to 6, and m represents an integer of from 1 to 6.

2. The process of claim 1 in which n represents 2 or 3.

3. The process of claim 1 in which m represents an integer of from 1 to 3.

4. The process of claim 1 in which compound c) is used in a quantity of from about 0.01 to 0.5% by weight based on 5. The process of claim 1 in which compound c) is used in a quantity of from about 0.1 to about 0.4% by weight based on the weight of the foam.

6. The process of claim 1 in which compound c) is represented by the formula

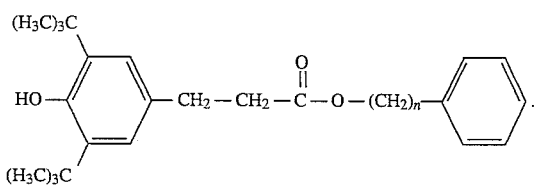

7. The process of claim 1 in which compound c) is represented by the formula:

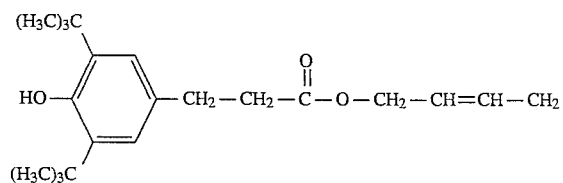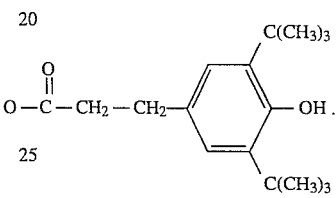

8. The process of claim 1 in which a compound d) for preventing foam discoloration that is not represented by Formula (I) or Formula (II) is also included in the reaction mixture.

9. The process of claim 8 in which compound d) is a diaryl amine.

10. The process of claim 1 in which the foam produced is a polyurethane foam.

11. The process of claim 1 in which the foam produced is a polyisocyanurate foam.

12. The foam produced by the process of claim 1.

13. The foam produced by the process of claim 6.

14. The foam produced by the process of claim 7.

* * * * *